(12) United States Patent
Lin et al.

(10) Patent No.: US 6,721,362 B2
(45) Date of Patent: Apr. 13, 2004

(54) CONSTRAINED DISCRETE-COSINE-TRANSFORM COEFFICIENTS FOR BETTER ERROR DETECTION IN A CORRUPTED MPEG-4 BITSTREAMS

(75) Inventors: Tao Lin, Fremont, CA (US); Stephen Molloy, Los Gatos, CA (US)

(73) Assignee: RedRock Semiconductor, Ltd., Sunnyvale, CA (US)

( * ) Notice: Subject to any disclaimer, the term of this patent is extended or adjusted under 35 U.S.C. 154(b) by 537 days.

(21) Appl. No.: 09/681,423

(22) Filed: Mar. 30, 2001

(65) Prior Publication Data

US 2002/0141502 A1 Oct. 3, 2002

(51) Int. Cl.[7] .......................... H04N 7/12; H04N 11/20; G06K 9/36
(52) U.S. Cl. ................ 375/240.27; 382/252; 348/425.2
(58) Field of Search ..................... 375/240.27, 240.24, 375/240.03, 240.16; 348/425.2, 420.1, 413.1, 402.1, 466; 382/252

(56) References Cited

U.S. PATENT DOCUMENTS

| 5,111,463 | A |  | 5/1992 | Zook ..................... 371/39.1 |
|---|---|---|---|---|
| 5,455,629 | A |  | 10/1995 | Sun et al. .................. 348/466 |
| 5,563,887 | A |  | 10/1996 | Harasaki .................... 370/94.1 |
| 5,734,755 | A |  | 3/1998 | Ramchandran et al. ..... 382/250 |
| 5,771,081 | A |  | 6/1998 | Lee ........................... 348/845.1 |
| 6,029,265 | A |  | 2/2000 | Itoi et al. ..................... 714/755 |
| 6,031,914 | A |  | 2/2000 | Tewfik et al. .................. 380/54 |
| 6,141,448 | A |  | 10/2000 | Khansari et al. ............. 382/236 |
| 6,154,571 | A |  | 11/2000 | Cox et al. .................... 382/250 |
| 6,170,074 | B1 |  | 1/2001 | Kondo et al. ................ 714/761 |
| 6,404,817 | B1 | * | 6/2002 | Saha et al. ............. 375/240.27 |
| 6,498,809 | B1 | * | 12/2002 | Dean et al. .................. 375/240 |

OTHER PUBLICATIONS

Fukunaga et al., "MPEG–4 Video Verification Model version 13.3", ISO/IEC JTC1/SC29/WG11, MPEG99/4960. 10/99, pp. 1–18,75–80,105,115–140,160–193.

* cited by examiner

Primary Examiner—Gims Philippe
(74) Attorney, Agent, or Firm—Stuart T. Auvinen

(57) ABSTRACT

Error detection is added to a motion-picture-experts group (MPEG) decoder by checking each 8×8-pixel block for constraints. The constraints are added during compression by adjusting discrete cosine transform (DCT) coefficients in the block to meet a constraint. When the decoder determines that the constraint is not met by the DCT coefficients, an error is signaled for that block. The error can then be concealed using pixels from another frame or block. In one embodiment, the constraint is that the last two non-zero coefficients have the same magnitude. The constraint is added during compression after quantization but before variable-length coding by averaging the magnitudes and using the average magnitude for the last two non-zero coefficients. This minimizes visible distortion caused by the constraints and reduces computations.

18 Claims, 7 Drawing Sheets

CONSTRAINED DISCRETE-COSINE-TRANSFORM COEFFICIENTS FOR BETTER ERROR DETECTION IN A CORRUPTED MPEG-4 BITSTREAMS

BACKGROUND OF THE INVENTION

This invention relates to video compression, and more particularly to error detection in corrupted video streams.

When high-quality sound and video were added to personal computers, an explosion in demand occurred for multimedia PC's. Today's wireless devices such as personal digital assistants (PDA's) have very limited graphics abilities and are thus similar to the early PC's. When high-quality video is added to such wireless devices, a demand explosion similar to the one that occurred for multimedia PC's is possible.

Adding video to such wireless devices is challenging in many aspects. Transmission over a wireless link or network can introduce bit errors to the video stream. Large data rates are needed to transmit even simple video, and various compression techniques are needed to squeeze video into limited wireless bandwidth.

Various compression standards have emerged for video stream. One standard that is well-suited for wireless video is the motion-picture-experts group MPEG-4 standard. The MPEG standard breaks each video frame (or video object plane VOP) into macroblocks. Each macroblock has 16×16 pixels, and is itself divided into four 8×8 blocks.

During MPEG compression, searches are made of surrounding pixels in a frame for a similar or identical image to that of each macroblock. When a close match is found, the difference in location of the macroblock in different frames is transmitted as a motion vector. When a motion vector is transmitted, the many pixels in the macroblock do not have to be re-transmitted; thus compression occurs. When the macroblock differ slightly, an error term or difference in pixels in the macroblock can be transmitted along with the motion vector.

FIG. 1 is a flowchart of prior-art MPEG compression of an 8×8 block in a macroblock. Each video frame in a sequence of frames is divided into macroblocks. A search of previous frames is made for the same image in the block or macroblock, and when successful a motion vector is generate for the macroblock, perhaps with an error term of pixel differences. When the search is unsuccessful, and for initial frames in a new image sequence, all pixels in the macroblock are transmitted.

The pixels in one 8×8 block in the macroblock, or the pixel-error terms and motion vector, are sent to the compression engine, or stored in a buffer memory. The compression engine reads these pixels or error terms, step 102.

A discrete cosine transform (DCT) is executed on the 64 pixels in the block, or on the error terms, step 104. This generates 8×8 DCT coefficients. The DCT coefficients are then divided by a factor Q_SCALE, step 106. This is known as quantization, as the results are rounded. Many small DCT coefficients are quantized to zero. These small coefficients represent small error terms or high-frequency image components such as sharp edges. Since many of the less-visibly-relevant high-frequency image components are truncated, compression occurs as less data is used to represent the image of the block.

A variable-length code is then used to encode the quantized DCT coefficients, step 108. The variable-length code replaces input coefficients with variable-length codewords. More common values of coefficients are encoded with shorter codewords while less frequent coefficient values are coded with longer codewords. Compression occurs since the more common values are coded with fewer bits of codeword than are less common values. The compressed 8×8 block is then output to a buffer memory or the transmitter, step 110.

FIG. 2 is a flowchart for prior-art MPEG decompression of a block. After de-framing and de-packetization of the bitstream, each macroblock is identified and each 8×8 block within a macroblock is decompressed. An 8×8 block is read from a buffer memory or the incoming bitstream, step 112. The variable-length code is used to convert the variable-length codewords back to the fixed-length coefficients, step 114. These coefficients are the quantized DCT coefficients for the 8×8 block.

The quantized DCT coefficients are de-quantized or scaled by the factor Q_SCALE, step 116. The factor Q_SCALE is multiplied by each quantized DCT coefficients to generate the DCT coefficients. This process is known as de-quantization.

An inverse discrete cosine transform is executed on the DCT coefficients, step 118, to recover the pixel data. Since the compression was lossy, some differences can exist between the original pixel data and the decompressed pixel data; however, these differences should be minor and not outstandingly visible. The pixel data is either all 64 pixels in the 8×8 block, or the pixel-error terms for the block. The error terms can be used to generate the pixels for the block from a block in a previous frame. The pixels then be stored in a buffer memory or displayed, step 120.

While MPEG compression and decompression are quite useful, when compressed MPEG video bitstreams are transmitted over a wireless network, errors are introduced into the bitstream. These errors can result in visible image distortions that can be quite noticeable. Detection of these bitstream errors is desirable. However, parity or other error-detection codes are not included in the MPEG standard, so error detection by such traditional methods is not possible. Indeed, adding parity bits would increase the amount of data transmitted in the bitstream, and would thus defeat the purpose of compression.

What is desired is an error detection method for video bitstreams. Error detection that is integrated with MPEG compression and decompression is desirable. Error detection that does not significantly increase the amount of data that is transmitted in the bitstream is desirable.

DETAILED DESCRIPTION

The present invention relates to an improvement in MPEG error detection. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that error detection is a desirable feature when video bitstreams are transmitted over error-prone wireless networks. However, traditional error-detection methods such as parity involve adding information such as parity bits to the data stream. For highly compressed streams, adding such parity data is undesirable since it reduces the effective compression ratio.

Instead of adding error-detection data, the inventors modify the existing data in the compressed video bitstream. Since lossy compression already introduces variations to the image data, introducing still more variations for the purpose of error detection may have a minimal impact. The compression ratio is not significantly affected when such variations are introduced. Thus error detection is added without significantly increasing the data in the compressed bitstream.

The variations introduced for the purpose of error detection are called constraints, since various coefficients are constrained to meet a constraint equation. When a properly designed constraint equation is used, the variations caused by the constraints can be invisible to the video viewer. Ideally, the error-detection constraints do not visibly affect the quality of the displayed video. Indeed, image quality can be improved, since detection of bitstream errors can allow the decoder to hide those detected errors.

The constraints must be introduced during compression in a way that does not violate the MPEG-4 syntax and semantics. The constraints should be transparent to the various steps required by MPEG compression and decompression. Ideally, the constraints should allow legacy MPEG decoders to read the constrained video bitstream as if the constraints were not present, while error-detecting decoders could use the constraint variations to detect and hide errors.

Figure 1:
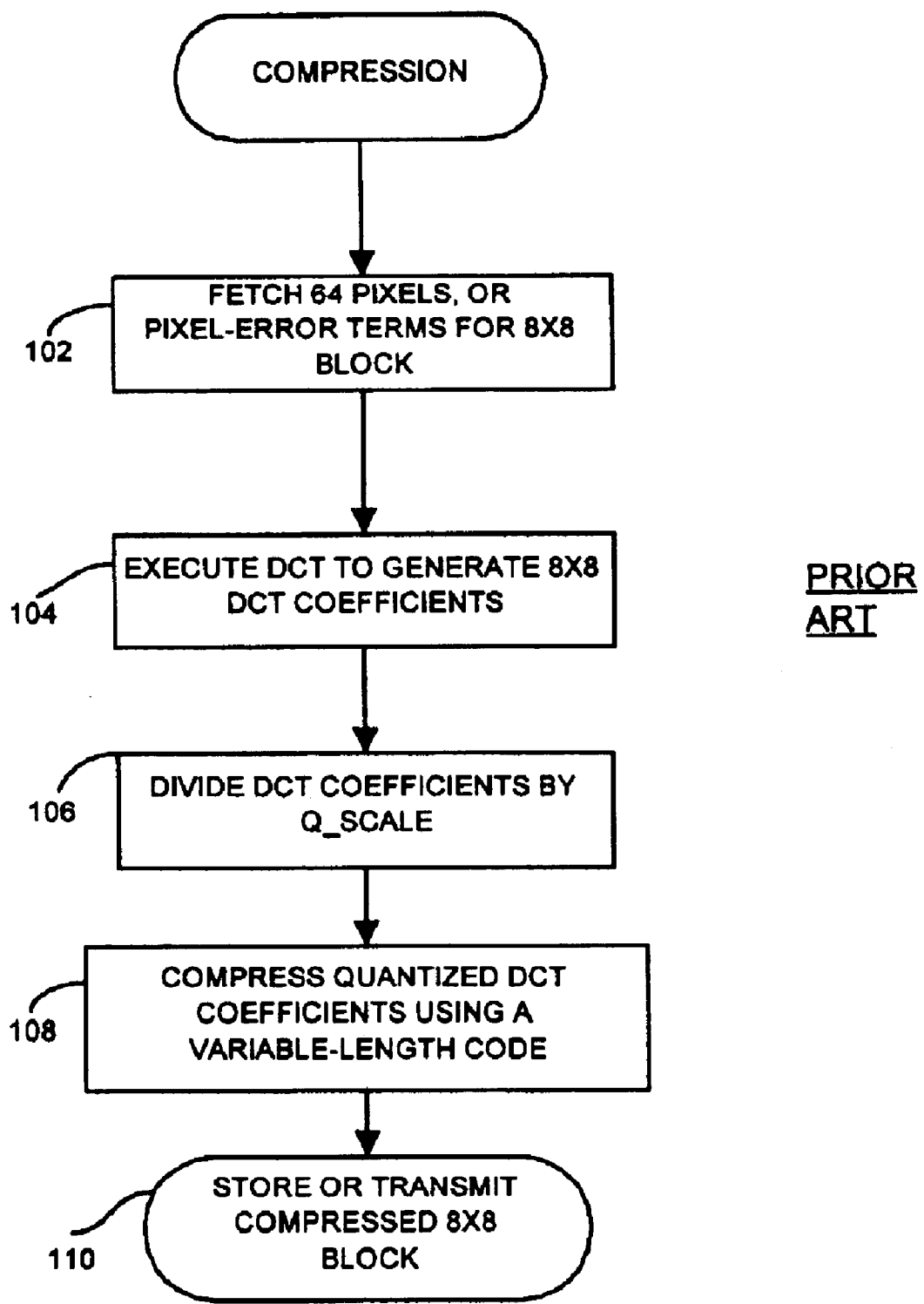
FIG. 1 is a flowchart of prior-art MPEG compression of an 8×8 block in a macroblock.
Figure 2:
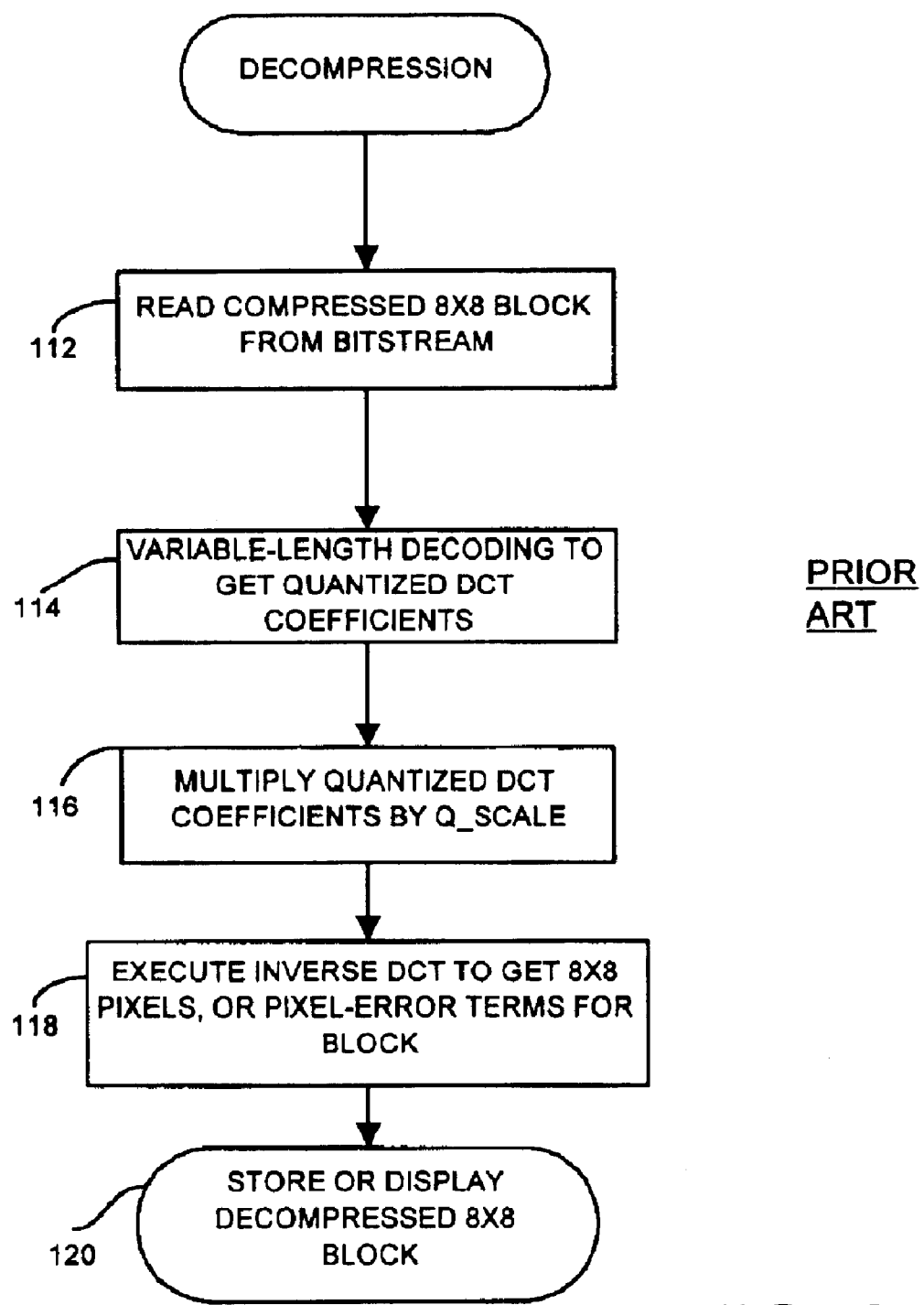
FIG. 2 is a flowchart for prior-art MPEG decompression of a block.
Figure 3:
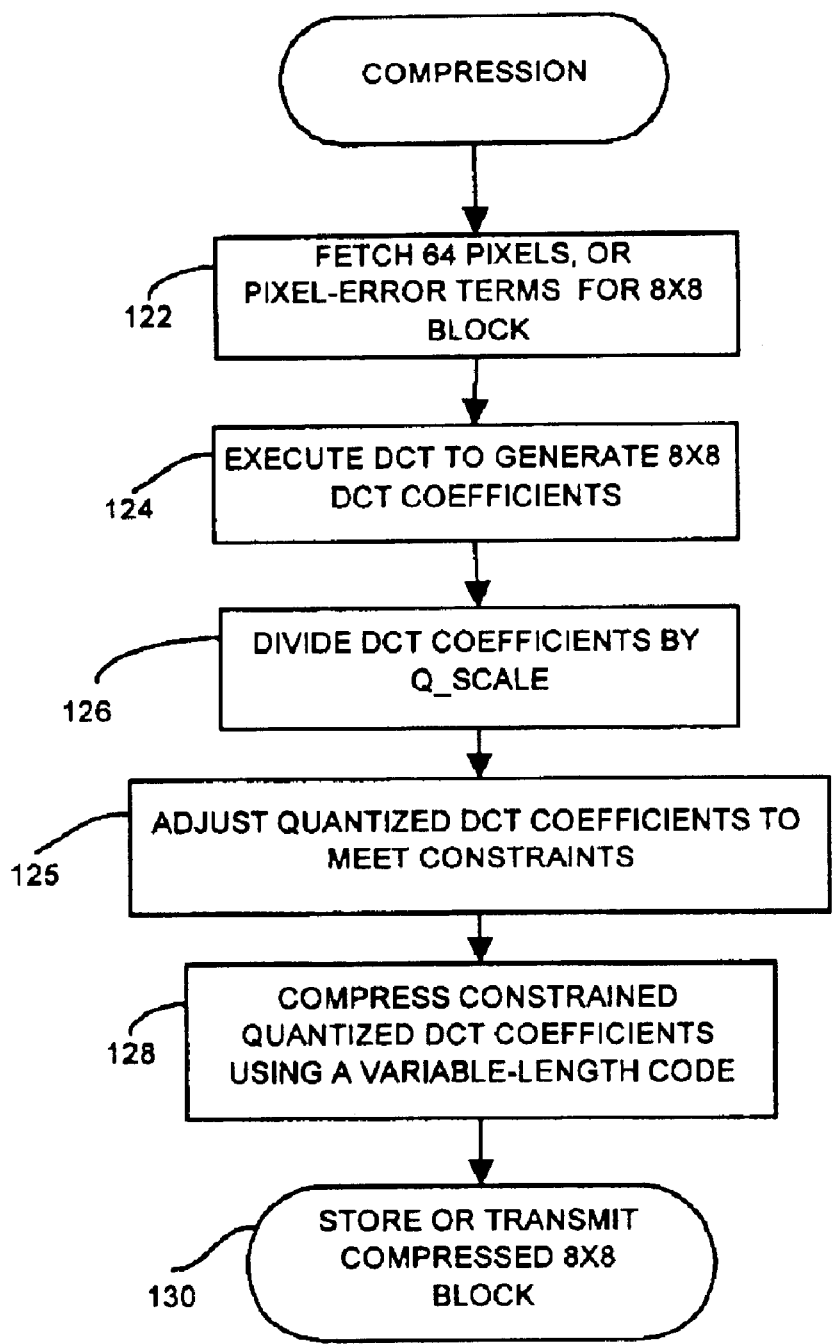
FIG. 3 is a flowchart of MPEG compression that imposes constraints for error detection.

FIG. 3 is a flowchart of MPEG compression that imposes constraints for error detection. The sequence of video frames is processed as a sequence of video object planes (VOP), each being an image divided into rows and columns of macroblocks. The macroblocks themselves are divided into four 8×8 blocks, each with 64 pixels.

A search is performed for each block in a previous frame to find a best-match block. The difference in locations between the best-match blocks in different frames is stored as the block's motion vector. When the blocks are not identical, pixel-error terms are generated as the difference in pixel values between the best-matching blocks in the different frames. When no good match is found, and for initial frames in a scene, all 64 pixels are stored for the block.

The compressor reads either the 64 pixel values, or the pixel-error terms for the block from a buffer memory, step 122. A discrete cosine transform (DCT) is executed on the pixels or error terms for the block to generate DCT coefficients, step 124. The DCT operation performs a frequency transform on the block of pixels, and is well-known in the art. Like the Fourier Transform, DCT converts spatial-domain data into frequency-domain data. The DCT tends to transform pixels or pixel-error terms with any values but small changes from pixel-to-pixel into a large percentage of near-zero DCT coefficients which can be deleted from the video bitstream by quantization. Compression occurs since these near-zero high-frequency pixel components are deleted from the bitstream.

The DCT coefficients are scaled by dividing each coefficient by the factor Q_SCALE, step 126. The value of Q_SCALE can be different for each block, and can be generated by the target compression ratio. Larger values of Q_SCALE are used when higher compression ratios are desired. The scaled values are truncated, thus removing some least-significant bits from the bitstream, and all the near-zero DCT coefficients become zero. This improves the compression ratio.

After quantization, the quantized DCT coefficients are varied to introduce the error-detection information into the bitstream. The quantized DCT coefficients for the 8×8 block are adjusted so that they meet the constraint equation or condition, step 125. An embodiment of these constraints are described in more detail later.

The constrained, quantized DCT coefficients are then variable-length coded, step 128. The variable-length code converts fixed-length coefficients into variable-length codewords. More common values of the coefficients are coded as shorter (fewer bits) codewords, while less common coefficient values are coded with longer codewords that use more bits. Since frequently-used values are coded with shorter codewords, compression occurs.

The variable-length codewords for the compressed, constrained, quantized DCT coefficients are output to the transmitter or stored in a buffer memory, step 130. The 64 pixels or error terms in the 8×8 block are compressed and ready for transmission. The compression is modified to introduce constraints that can be used by a decoder to detect transmission errors.

Figure 4:
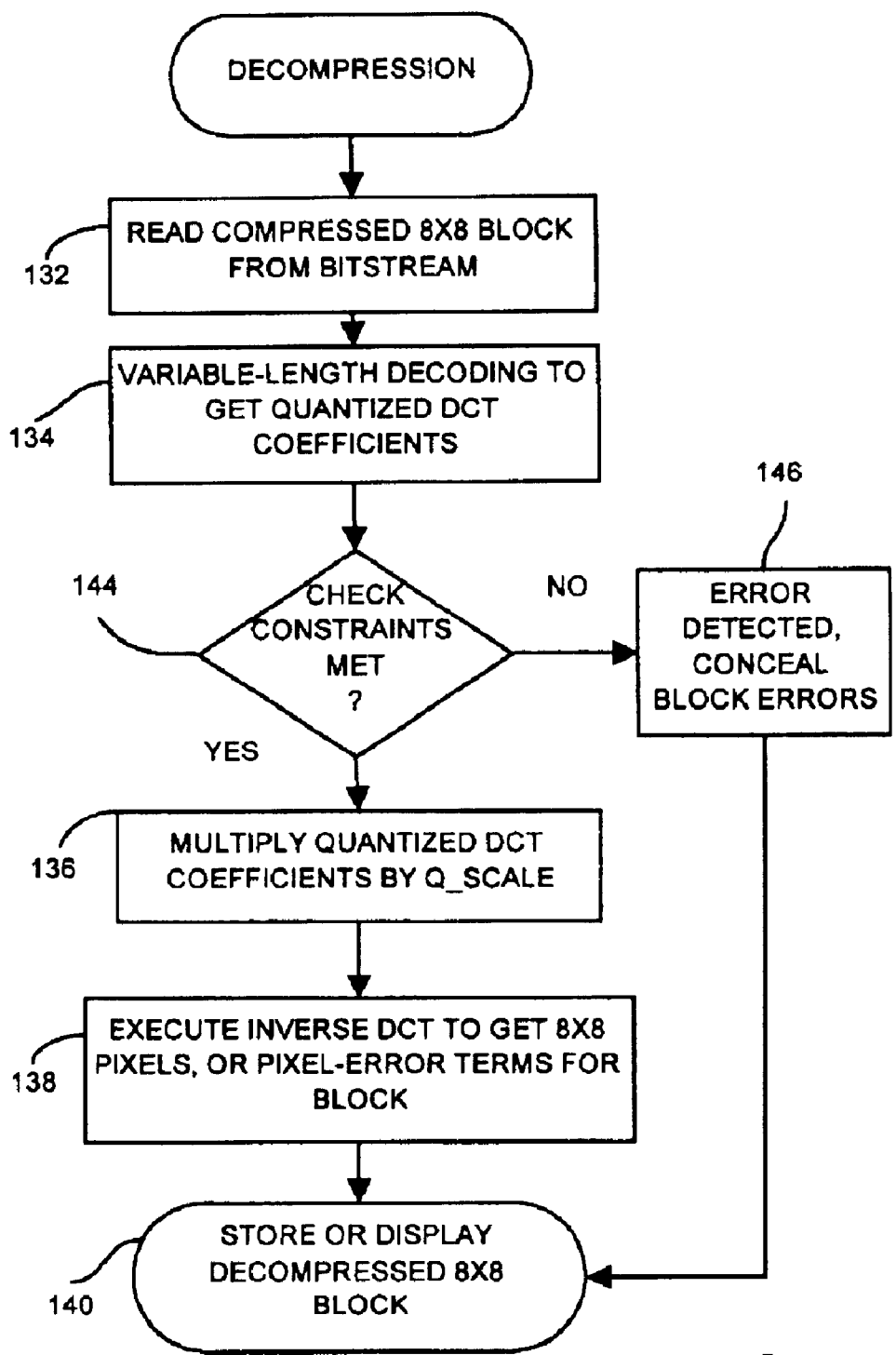
FIG. 4 is a flowchart of MPEG decompression that checks constraints to detect errors in a video bitstream.

FIG. 4 is a flowchart of MPEG decompression that checks constraints to detect errors in a video bitstream. These errors may have been introduced when the bitstream was transmitted over a network. Wireless networks are likely to introduce many such errors into video bitstreams.

The incoming video bitstream contains a sequence of image frames or video object planes (VOP) that contain compressed macroblock data. The data for each macroblock is extracted. Each macroblock contains data for four compressed 8×8 blocks. Any motion vector data is also read from the bitstream for later use in motion compensation.

The current 8×8 block in the current macroblock is read from a buffer memory or from the bitstream, step 132. The codewords from the bitstream are decoded or translated from the variable-length code to the fixed-length coefficients, step 134. This is the reverse of the variable-length coding performed during compression. The coefficients output are quantized DCT coefficients.

The coefficients are checked to see if they meet the constraints, step 144. Some of the coefficients may be input to a constraint equation to see if the coefficients meet the constraint equation. One embodiment of constraint checking is shown later in FIG. 5.

When the constraints are met, de-compression of the current 8×8 block can continue. The quantized DCT coefficients are multiplied by the factor Q_SCALE, step 136, to perform de-quantification. Some of the least-significant bits were discarded by quantization during compression, so the recovered DCT coefficients are somewhat different from the original DCT coefficients before compression. Especially the smaller DCT coefficients near zero may differ, but the visible differences should be negligible.

The recovered DCT coefficients are transformed back to pixel data by executing an inverse-DCT operation, step 138. The recovered DCT coefficients are converted back to pixel data, either the 64 pixels in the 8×8 block, or the error terms or pixel differences from a block in an earlier frame. The error terms can be used to generate the 64 pixels for the 8×8 block. These pixels are then stored in a buffer memory, or displayed, step 140.

When the constraints are not met, step 144, then an error is present in the 8×8 block. Since the extent or exact pixel location of the error is not known within the 64 pixel block, correction of the error is not possible. However, concealment of the error may be possible. For example, the pixels or error terms for the 8×8 block can be discarded, and the previous frame's block of pixels retrieved and displayed. Since the frames may be displayed at 30 or more times per second, and the error is unlikely to recur in the same 8×8 block of other frames, loss of one block in one frame should not be noticeable to the viewer. Error concealment step 146 hides the error in the 8×8 block by using pixels from an earlier frame, or using other concealment methods such as averaging pixels from the same block in the previous and next frames. Spatial interpolation from pixels above, below, and to the left and right of the 8×8 block can also be used for error concealment.

Error-Detection Constraints

A wide variety of constraint limitations or equations can be used. An 8×8 block has as many as 64 quantized DCT coefficients $c[0], c[1], c[2], \ldots c[62], c[63]$. These coefficients are in a zig-zag order. One embodiment of a zig-zag order generated by diagonally re-ordering 64 coefficients is:

$c[1], c[2], c[6], c[7], c[15], c[16], c[28], c[29],$
$c[3], c[5], c[8], c[14], c[17], c[27], c[30], c[43],$
$c[4], c[9], c[13], c[18], c[26], c[31], c[42], c[44],$
$c[10], c[12], c[19], c[25], c[32], c[41], c[45], c[54],$
$c[11], c[20], c[24], c[33], c[40], c[46], c[53], c[55],$
$c[21], c[23], c[34], c[39], c[47], c[52], c[56], c[61],$
$c[22], c[35], c[38], c[48], c[51], c[57], c[60], c[62],$
$c[36], c[37], c[49], c[50], c[58], c[59], c[63], c[64].$

Many of these coefficients may be zero, especially after quantization when the block contains pixel-error terms rather than the pixels themselves. Pixels that have changed only slightly from the previous frame have small-value error terms and small changes from one error term to another. Quantization truncates these small error terms to zero.

Most frames after the initial frame in a new visual scene contain many blocks that can be transmitted as motion vectors and error terms, which is a significant compression from transmitting all 64 pixels in a block. Thus zero terms are common in video bitstreams.

Since many of the coefficients are zero, the number of consecutive zero coefficients can be counted and the number of consecutive zero components between two non-zero coefficients transmitted. Assume that only k out of 64 coefficients are non-zero in an 8×8 block. These non-zero coefficients in the zig-zag order are:

$c[n_1], c[n_2], c[n_3], \ldots c[n_k-1], c[n_k].$

The constrained non-zero DCT coefficients are designated as c' coefficients:

$c'[n_1], c'[n_2], c'[n_3], \ldots c'[n_k-1], c'[n_k].$

When there are very few non-zero coefficients, no constraints are imposed since errors are less likely to occur in the block that has very few coefficients and little data transmitted than in blocks with more transmitted data. Also, altering the few coefficients for constraints may be more noticeable to a viewer since the block has few visible differences from earlier frames. Thus when the number of non-zero coefficients is less than 3 (k<3), the constrained coefficients are the same as the unconstrained DCT coefficients:

$c'[n_k]=c[n_k]$ and $c'[n_k-1]=c[n_k-1].$

When there are 3 or more non-zero coefficients (k>=3), then the last two non-zero coefficients are constrained to have the same magnitude. The other non-zero coefficients are not changed by the constraints. Only the last two non-zero coefficients are constrained.

The constraint equation checked by the decompressor is thus:

$(k<3)$ OR $|c'[n_k-1]|==|c'[n_k]|.$

This constraint equation can be easily checked by counting the number of non-zero coefficients received for the block, and dropping the sign bits for the last two non-zero coefficients and comparing their magnitudes.

These constraints can be imposed by the compressor by adjusting the last two non-zero coefficients when there are more than 2 non-zero coefficients. Although the magnitudes of these last 2 coefficients could be adjusted in many ways to make them equal, one effective method is to average magnitudes of the 2 coefficients without changing the signs. The constraint imposed when k>3 is then:

$c'[n_k-1]=\text{sign}(c[n_k-1])*(|c[n_k-1]|+|c[n_k]|)/2,$ and $c'[n_k]=\text{sign}(c[n_k])*(|c[n_k-1]|+|c[n_k]|)/2.$ The sign function simply returns the sign (+ or −) and is used to ensure that the constrained coefficient has the same sign as the pre-constrained coefficient. Keeping the sign the same minimized visible distortions caused by the constraints, since large positive-to-negative changes in the pixels are avoided.

This sign is appended to the average of the last two non-zero coefficients. Since the average is taken of the two coefficients, the amount of adjustment for the constraint is minimized and shared among the two coefficients. This minimizing of constraint adjustments helps to minimize any visible distortion caused by the constraints.

Figure 5:
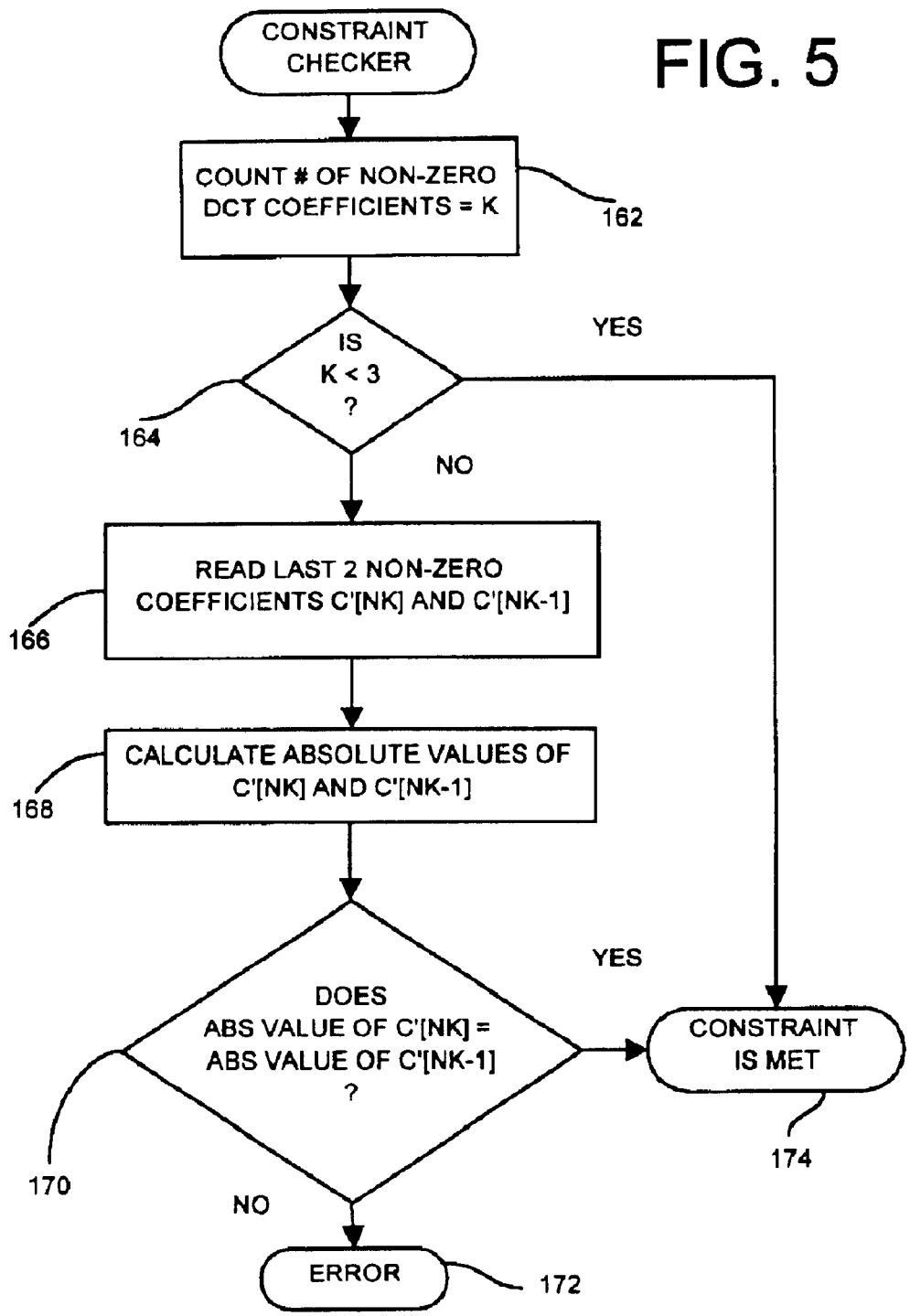
FIG. 5 is a flowchart for a constraint checker in an MPEG decoder.

FIG. 5 is a flowchart for a constraint checker in an MPEG decoder. The last two non-zero quantized DCT coefficients are constrained to have equal magnitudes by the MPEG encoder, when there are three or more non-zero coefficients in a block. These constraints can be imposed by averaging as described above, or by other methods such as setting the magnitude of the last non-zero coefficient to the magnitude of the penultimate non-zero coefficient, or setting both to some fixed magnitude.

After the decoder has variable-length decoded and de-quantized the block from the transmitted bitstream, the DCT coefficients are sent to the constraint checker. The constraint checker counts the number of non-zero coefficients to determine the value of k, step 162. When K is less than 3, step 164, then the constraint is met for this block, step 174. Constraints are not imposed for blocks with very few non-zero terms to minimize visible distortions. Errors are more likely to occur in larger blocks than in smaller blocks.

For larger blocks with more than two non-zero terms (k>=3), the last two non-zero coefficients are read, step 166.

These coefficients are c'[$n_k$−1] and c'[$n_k$]. The magnitudes of these terms are generated by taking the absolute values of these coefficients, step 168. When a signed number format is used, the sign bit can be dropped to obtain the absolute values.

The magnitudes of these last two coefficients are compared, step 170. Such a comparison can be made by subtracting one from another and reading a zero flag of an arithmetic-logic-unit to see if the difference is zero. A bit-wise comparison could also be done to look for mismatching bits that indicate non-equality.

When the magnitudes match, the constraint has been met, step 174, and decoding of the block can continue. When the magnitudes do not match, then an error is detected, step 172.

Constraint checking using the above constraints is quite simple and easy to implement in hardware or software executed on a digital-signal processor (DSP) or other processing device. Error detection is achieved with only minimal additional processing effort.

Figure 6:
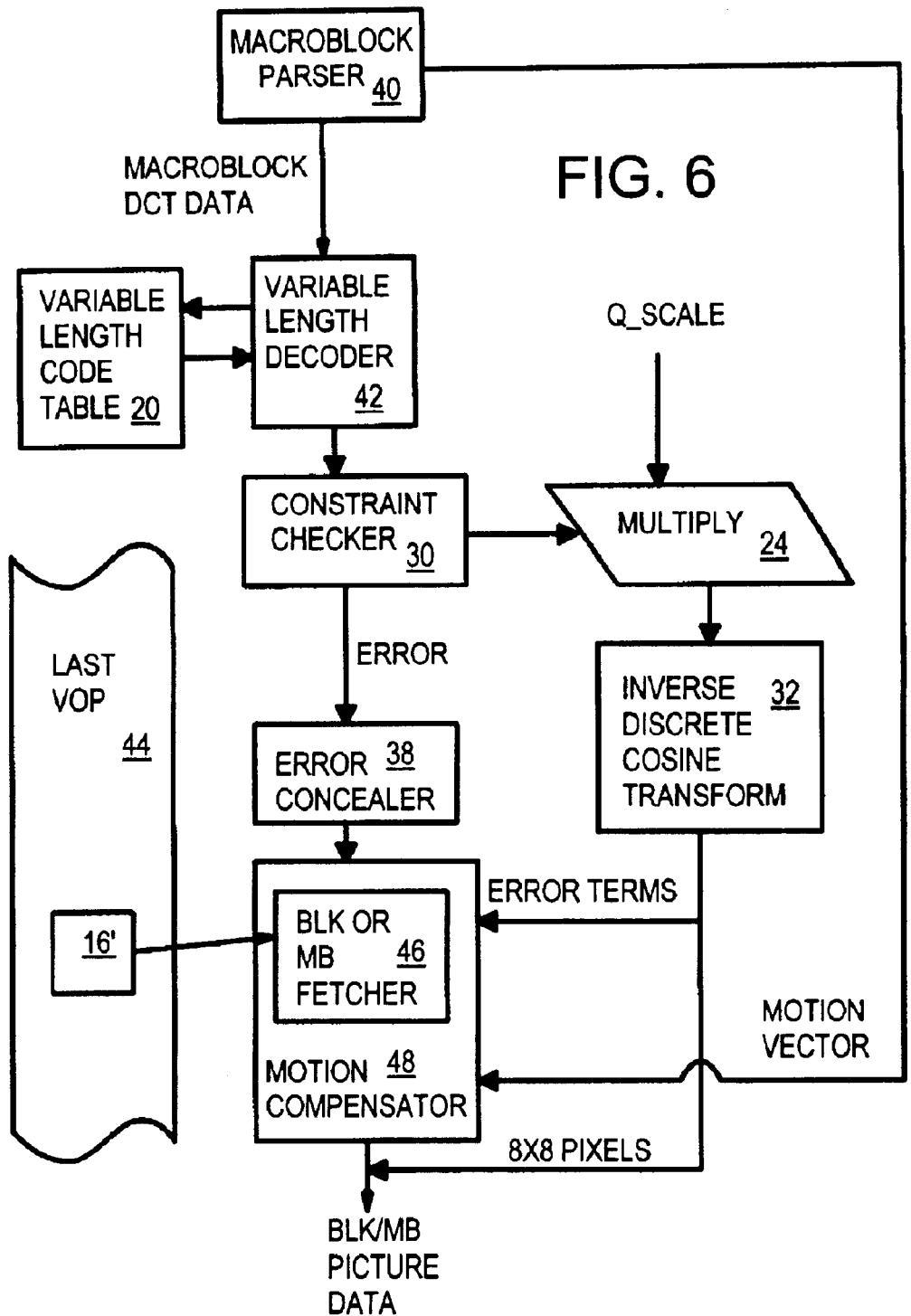
FIG. 6 is a block diagram of a portion of an MPEG decoder with block-error detection using constraint checking.

FIG. 6 is a block diagram of a portion of an MPEG decoder with block-error detection using constraint checking. Macroblock parser 40 parses the incoming bitstream for 16×16 macroblocks, and outputs an 8×8 block's data. The encoded DCT coefficients for the block are output to variable-length decoder 42, while any motion vector is output to motion compensator 48 for later use.

Variable-length decoder 42 looks up each encoded DCT coefficient or codeword in lookup table 20. Lookup table 20 contains fixed-length entries that are selected by the variable-length codeword. The fixed-length entries are the DCT coefficients that are encoded by the codeword during compression. Although not commonly done, the lookup table 20 can be reloaded for different sequences of frames with different entries, allowing different coding associations. This allows the variable-length code to adapt to the video stream and more efficiently code the most common data.

Variable-length decoder 42 outputs the quantized DCT coefficients to constraint checker 30. Constraint checker 30 determines when the error-detection constraints have been met. A processing unit can be programmed to execute the procedure of FIG. 5 to perform constraint checking, or logic can be designed to implement part or all of the procedure in hardware. The procedure can be modified for other constraint equations.

When constraint checker 30 determines that the constraints have been met, the quantized DCT coefficients are output to multiplier 24. Multiplier 24 receives the factor Q_SCALE from a packet or frame (VOP) header of the bitstream. The value of Q_Scale may vary with each macroblock. Multiplier 24 multiplies each non-zero quantized DCT coefficient by Q_SCALE to recover the DCT coefficients. This is the de-quantification process.

Transformer 32 performs an inverse DCT operation on the DCT coefficients from multiplier 24. This converts the frequency-domain DCT coefficients to spatial-domain pixel data. Transformer 32 can be implemented by a programmed processing element, possibly the same element as multiplier 24 and constraint checker 30. When the pixel data includes all 64 pixels in the 8×8 block, such as for an initial frame in a visual scene, these recovered pixels are output as the pixel data for the 8×8 block.

More often, the pixel data recovered by transformer 32 contains error terms, or differences in pixels for the block from a different frame. These error terms are sent to fetcher 46, which also receives the motion vector from macroblock parser 40. Fetcher 46 uses the motion vector to determine the relative location of the corresponding (best-match) block from an earlier frame, and reads the pixels from this earlier block 16' from the last frame (VOP) area of memory 44.

The error terms are combined with the pixels read from memory 44 to adjust the old pixels from earlier block 16' to obtain the new pixels for the current block. The error term can be subtracted from the old pixels or some other specified operation can be performed to combine the error terms with the old pixel data. Motion compensator 48 combines the error terms to generate the new pixels, and places these pixels in the proper location in the current block. These corrected pixels are then output as the 64 pixels for the block.

When constraint checker 30 finds that the constraints have not been met, an error is signaled for this 8×8 block. Error concealer 38 is activated by the error signal. Error concealer 38 may hide the block error by fetching the earlier block 16' from memory 44 and use motion compensator 28 to use the motion vector to place the old pixels in the new location. For blocks with no motion vector, error concealer 38 may fetch the pixels from memory 44 for the same block location in an earlier frame and use those pixels for the current block. Error concealer 38 could also fetch pixels from a later frame and average the pixels from the earlier and later frames, and use the average pixels for the current block. Other error concealment methods are also possible.

The error detection is at the 8×8 block level. Errors can be detected in individual 8×8 blocks, allowing a fine granularity to error detection. Errors are localized to one particular block, allowing other blocks in the frame to be displayed. Although errors may not be localized to individual pixels, the errors are located to within one block, minimizing image distortion caused by the error. Error concealment is more effective since only blocks with errors need to be concealed while other blocks are displayed.

Figure 7A:
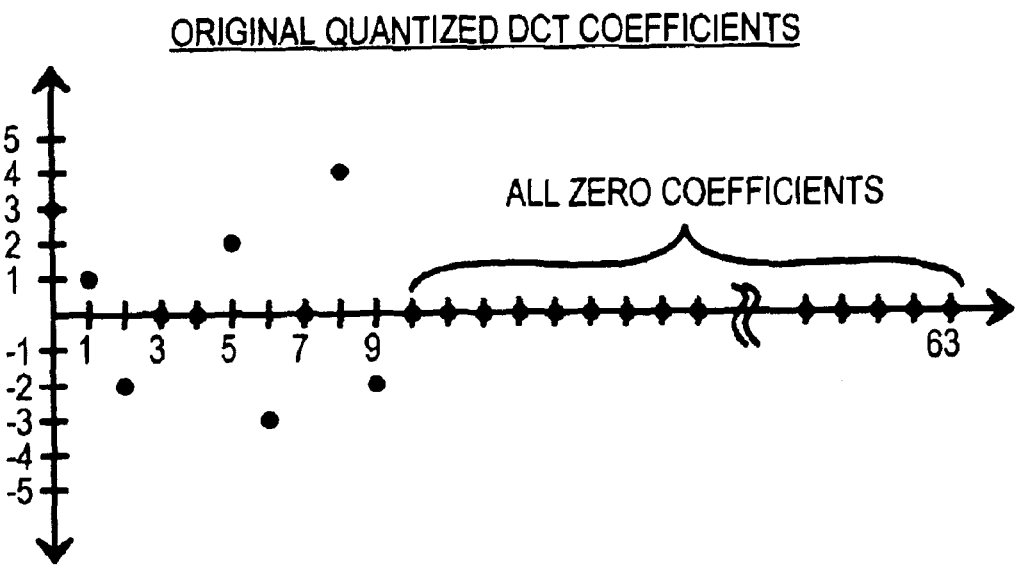
FIGS. 7A–B show an example of constraints imposed on DCT coefficients during MPEG compression.
Figure 7B:
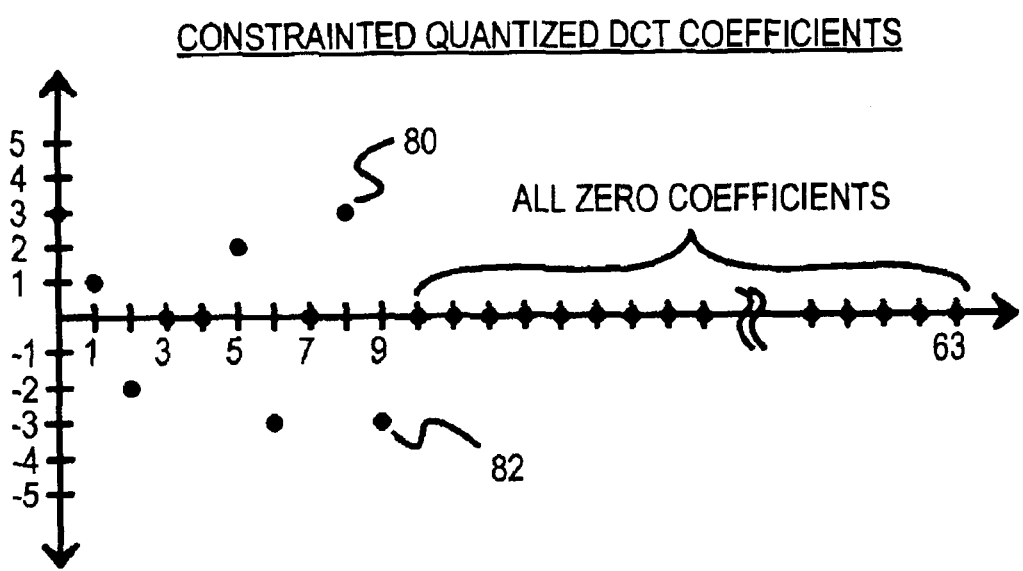

FIGS. 7A–B show an example of constraints imposed on DCT coefficients during MPEG compression. In FIG. 7A, the 64 DCT coefficients of an 8×8 block are shown along the x-axis, with the value of each coefficient shown in the y-axis. Most of the coefficients are zero, such as coefficients 3, 4, 7, and 10–63. Zero coefficients are common for error terms of blocks with little change among frames.

Some coefficients are non-zero. Coefficient c[0] is 3, c[1] is 1, c[2] is −2. The last two non-zero coefficients are c[8]=c[$n_k$−1]4 and c[9]=c[$n_k$]=−2. The total number of non-zero coefficients (k) is 7.

Using the constraint equation:

$$c'[n_k-1] = \text{sign}(c[n_k-1]) * (|c[n_k-1]| + |c[n_k]|)/2$$
$$= +1*(|4|+|-2|)/2 = +1*6/2 = 3$$
$$c'[n_k] = \text{sign}(c[n_k]) * (|c[n_k-1]| + |c[n_k]|)/2.$$
$$= -1*(|4|+|-2|)/2 = -1*6/2 = -3$$

Thus c[8] is adjusted from 4 to 3, while c[9] is adjusted from −2 to −3. FIG. 7B shows the constraints imposed upon the coefficients of FIG. 7A. Coefficient c[8] 80 is adjusted from 4 down to 3, while coefficient c[9] 82 is adjusted from −2 to −3, an increase in magnitude.

The constraints only affect the last two of the non-zero coefficients, minimizing any visible distortions caused by the constraints. The magnitudes of the last two non-zero constraints are averaged, minimizing the adjustment of these coefficients. The sign of each coefficient is maintained, avoiding any large sign changes that could produce a significant distortion to the block.

Alternate Embodiments

Several other embodiments are contemplated by the inventors. For example, buffers can be added to various stages in the decoder and compressor to buffer data. Pipelining may also be employed, and pipeline stage registers can be added. When a general-purpose processor is used, the intermediate data can be stored back to a general-purpose memory or placed in a scratchpad memory or other buffer.

Many other constraint methods and equations can be used, such as averaging three, four, or all non-zero coefficients and making their magnitudes equal. The first and last non-zero coefficients could be averaged rather than the last and penultimate non-zero coefficients. Any pair of non-zero coefficients could be used, such as two middle coefficients. Rather than averaging, other equations could be used, such as squaring, adding, and taking the square root to obtain a magnitude to adjust to. An arbitrary or predetermined magnitude could also be adjusted to and checked for.

Constraints could also be performed on coefficients before quantization, although there would be more non-zero coefficients. Constraints could be added to the variable-length code during coding and checked during variable-length decoding. Of course, such variations may not be as optimal as the embodiment described in detail herein.

Errors can also be concealed by using pixels from surrounding blocks, or by averaging pixels from the surrounding blocks. Many other error concealment methods are possible.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for detecting errors in a bitstream comprising:

receiving a bitstream containing transmission errors;
   parsing the bitstream for a block within a macroblock;
   extracting block data for the block from the bitstream;
   decoding variable-length codewords in the block data to generate coefficients for the block;
   determining when an error-detection constraint is met by the coefficients and when the error-detection constraint is not met by the coefficients for the block; and
   when the error-detection constraint is met, transforming the coefficients to generate pixel data for the block for display;
   when the error-detection constraint is not met, signaling an error for the block and concealing the error by discarding the coefficients and not generating display data from the coefficients for the block;
   coding the bitstream before transmission by altering at least two non-zero coefficients before coding with the variable-length codewords but after the pixel data is transformed to coefficients using a discrete cosine transform (DCT);
   wherein altering the at least two non-zero coefficients comprises:
      selecting a first and a second non-zero coefficients from coefficients that are not zero-valued;
      calculating an average magnitude from magnitudes of the first and second non-zero coefficients; and
      adjusting magnitudes of the first and second non-zero coefficients to have the average magnitude but not altering signs of the first and second non-zero coefficients,
   whereby at least two coefficients are constrained to the average magnitude and whereby errors in the block are detected by constraint checking of the coefficients for the block.

2. The method of claim 1 further comprising:
   when the pixel data comprises error terms, fetching an old block of old pixels from a memory containing a previous frame of blocks, combining the error terms with the old pixels to generate pixels for display,
   whereby error terms are generated and used for display when the error-detection constraint is met.

3. The method of claim 2 further comprising:
   extracting a motion vector for the block from the bitstream;
   using the motion vector to generate a memory address for fetching the old block of pixels,
   whereby the motion vector locates the old block of pixels.

4. The method of claim 3 when the pixel data comprises pixels, displaying the pixels for the block.

5. The method of claim 1 wherein the block represents 64 pixels and the macroblock contains four blocks,
   wherein the error is signaled to conceal the error in the block but not to conceal pixels in other blocks, the method being repeated for other blocks in a frame of macroblocks to detect errors in each of the other blocks,
   whereby block-level error-detection granularity is provided.

6. The method of claim 1 wherein transforming the coefficients to generate pixel data comprises executing an inverse discrete cosine transform (DCT) on the coefficients to generate the pixel data.

7. The method of claim 6 wherein transforming the coefficients to generate pixel data further comprises multiplying each coefficient by a factor before executing the inverse DCT on the coefficients.

8. The method of claim 6 wherein determining when an error-detection constraint is met comprises:
   comparing a magnitude of a first constrained coefficient in the coefficients to a magnitude of a second constrained coefficient in the coefficients for the block,
   whereby constrained coefficients are compared for error detection.

9. The method of claim 8 wherein determining when an error-detection constraint is met further comprises:

signaling the error for the block when magnitudes of the first and second constrained coefficient do not match.

10. The method of claim 8 wherein the first and second constrained coefficients are a last and a penultimate non-zero coefficient in the coefficients for the block, whereby at least two non-zero coefficients are constrained.

11. The method of claim 8 wherein determining when an error-detection constraint is met further comprises:

determining when a number of the coefficients for the block is below a threshold and determining that the error-detection constraint is met when the number of coefficients is below the threshold, whereby small blocks with few coefficients are not checked for error.

12. The method of claim 1 wherein selecting a first and a second non-zero coefficients from coefficients that are not zero-valued comprises selecting a last of the coefficients that are not zero-valued and selecting a penultimate of the coefficients that are not zero-valued, whereby the last and penultimate non-zero coefficients are constrained for error detection.

13. An error-detecting decoder comprising:

a bitstream parser coupled to receive compressed video data and locate a block of pixels within the compressed video data and output compressed block data;

a variable-length decoder, receiving the compressed block data and converting variable-length codewords in the compressed block data to block coefficients;

a constraint checker, receiving the block coefficients, for selecting at least two coefficients in the block coefficients and signaling an error when the at least two coefficients fail to meet a constraint;

an error concealer, activated by an error detected by the constraint checker, for preventing the block coefficients from being used to generate pixels for display when the error is detected; and a coefficient transformer, receiving the block coefficients, for generating block data by inverse transforming the block coefficients, the block data being either pixels for display in the block or error terms for generating pixels for display for the block from stored pixels, whereby errors in the block are detected and concealed when coefficients fail to meet the constraint.

14. The error-detecting decoder of claim 13 further comprising:

a multiplier, receiving the block coefficients, for multiplying the block coefficients by a scale factor before the coefficient transformer generates the block data.

15. The error-detecting decoder of claim 13 further comprising:

a motion compensator, receiving a motion vector from the bitstream parser, for fetching old pixels from a block in a previous frame and adjusting the old pixels with the error terms to generate the pixels for display, the motion vector for locating the old pixels in the previous frame.

16. The error-detecting decoder of claim 13 wherein the constraint checker signals the error when magnitudes of the at least two coefficients are not equal, whereby the at least two coefficients are constrained by magnitude equality.

17. A compressor for adjusting a video stream for error-detection comprising:

discrete cosine transform (DCT) means, receiving blocks of pixels or error terms for blocks of pixels, for discrete-cosine transforming a block of pixels or error terms to generate DCT coefficients;

quantize means, receiving the DCT coefficients, for discarding least-significant bits of low-valued DCT coefficients to generate zero-valued DCT coefficients;

constraint-adjust means, receiving DCT coefficients, for adjusting values of DCT coefficients to embed error-detection information into adjusted DCT coefficients; and variable-length encode means, receiving the adjusted DCT coefficients, for coding the adjusted DCT coefficients as codewords of varying lengths, the codewords requiring less storage capacity than the DCT coefficients for an average block in the video stream;

wherein the constraint-adjust means comprises:

select means for selecting at least two coefficients from the DCT coefficients;

average means, receiving the at least two coefficients from the select means, for generating an average magnitude from magnitudes of the at least two coefficients; and substitute means for replacing magnitudes of the at least two coefficients with the average magnitude without altering signs of the at least two coefficients, and for not altering other DCT coefficients to generate the adjusted DCT coefficients, whereby magnitudes are averaged and substituted and whereby the video stream is embedded with error-detection information and compressed.

18. The compressor of claim 17 wherein the constraint-adjust means further comprises:

count means for counting a number of the DCT coefficients having non-zero values;

bypass means for disabling the substitute means from replacing the magnitudes when the count means counts less than a threshold number of non-zero DCT coefficients, whereby blocks with fewer than the threshold number of non-zero DCT coefficients are not altered in magnitude of DCT coefficients, but blocks with more than the threshold number of non-zero coefficients have some magnitudes of DCT coefficients replaced with the average magnitude.

* * * * *